United States Patent [19]

Kanamori et al.

[11] Patent Number: 5,381,503
[45] Date of Patent: Jan. 10, 1995

[54] MODE FIELD DIAMETER CONVERSION FIBER

[75] Inventors: Hiroo Kanamori; Koji Nakazato; Masayuki Nishimura, all of Yokohama; Shigeru Tomita, Mito, all of Japan

[73] Assignees: Sumitomo Electric Industries, Ltd., Osaka; Nippon Telegraph and Telephone Corporation, Tokyo, both of Japan

[21] Appl. No.: 61,385

[22] Filed: May 14, 1993

[30] Foreign Application Priority Data

Aug. 19, 1992 [JP] Japan .................. 4-220408

[51] Int. Cl.⁶ .............................. G02B 6/10
[52] U.S. Cl. ......................... 385/123; 385/142
[58] Field of Search ............... 385/123, 124, 126, 127, 385/128, 129, 130, 131, 132, 141, 142

[56] References Cited

U.S. PATENT DOCUMENTS

| | | | |
|---|---|---|---|
| 4,106,850 | 8/1978 | Macatili | 385/142 |
| 4,447,127 | 5/1984 | Cohen et al. | 385/127 |
| 5,206,925 | 4/1993 | Nakazawa et al. | 385/142 |

OTHER PUBLICATIONS

Shiraishi et al., "Beam Expanding Fiber Using Thermal Diffusion of the Dopant", IEEE, Aug. 1990, pp. 1151-1161.
Harper et al., "Tapers in Single-Mode Optical Fibre by Controlled Core Diffusion", Electronics Letters, 18th, Feb., 1988, vol. 24, No. 4, pp. 245-246.

*Primary Examiner*—Rodney B. Bovernick
*Assistant Examiner*—John Ngo
*Attorney, Agent, or Firm*—Cushman, Darby & Cushman

[57] ABSTRACT

There is disclosed an optical waveguide comprising a core portion made of a light propagating material and a cladding portion, a first dopant and a second dopant being induced into said core portion, the first dopant having a function of increasing a refractive index of the light propagating material and having a first thermal diffusion coefficient to said light propagating material, the second dopant having a function of decreasing the refractive index of said light propagating material and having a second thermal diffusion coefficient to the light propagating material larger than the first thermal diffusion coefficient under a predetermined temperature.

24 Claims, 13 Drawing Sheets

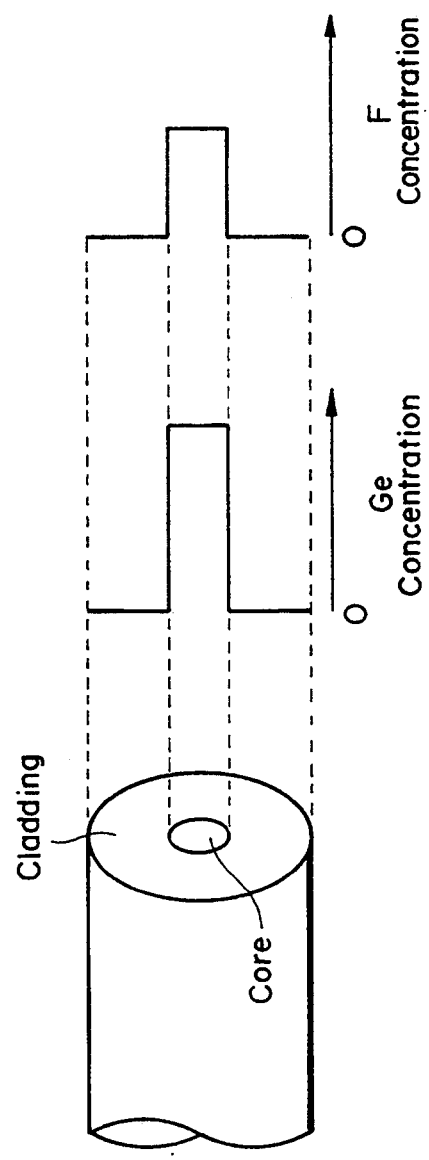

Change in concentration distribution of first dopant

Change in concentration distribution of second dopant

Change in refractive index $D \approx D'$

Change in concentration distribution of first dopant

Change in concentration distribution of second dopant

Change in refractive index $D < D'$

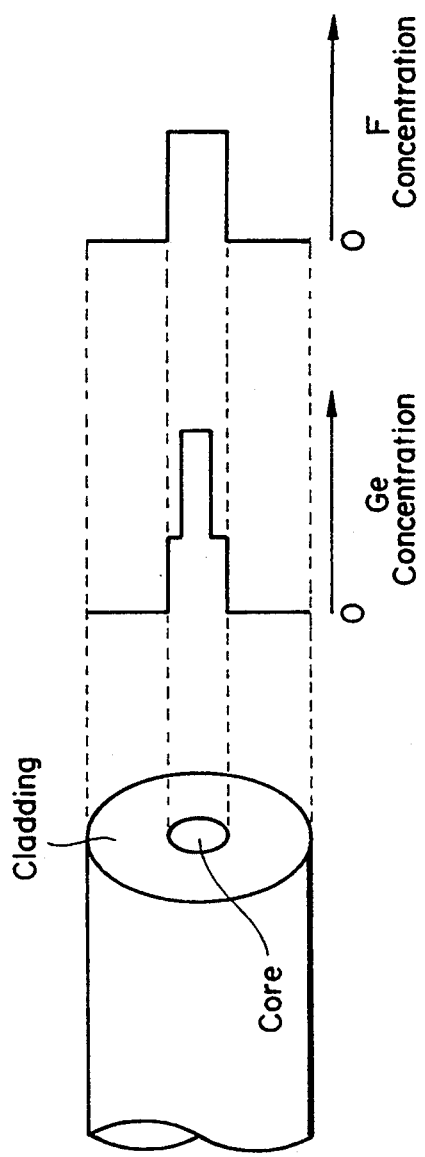

Change in concentration distribution of first dopant

Change in concentration distribution of second dopant

Change in refractive index

MODE FIELD DIAMETER CONVERSION FIBER

BACKGROUND OF THE INVENTION

1. Field of the Invention

The present invention relates to an optical waveguide capable of converting a mode field diameter at a desired portion thereof, such as a mode field diameter conversion fiber and a planar light waveguide device.

2. Related Background Art

A conventional beam expanding fiber is disclosed in the reference titled as "Beam Expanding Fiber Using Thermal Diffusion of the Dopant" in Journal of Lightwave Technology. Vol. 8, No. 8 August 1990. The beam expanding fiber of the above reference has a core in which Ge is induced and the induced Ge is thermally diffused so that a spot size of the propagating mode, which corresponds to "mode-field diameter of the optical fiber", is partially expanded.

By increasing the mode field diameter at the end of the optical fiber as shown in the above reference, it is possible to insert an optical device between the fibers with the expanded mode fields without significant loss increase.

The above conventional fiber, however, includes a problem that a long time heating is needed to increase the mode field diameter.

SUMMARY OF THE INVENTION

It is an object of the present invention to provide a mode field diameter conversion optical element capable of changing the mode field diameter (the spot size of the propagating mode) in a desired portion thereof.

In order to solve the above problems, the optical waveguide according to the present invention comprises a core portion made of a light propagating material; and a cladding portion, a first dopant and a second dopant being induced into said core portion, the first dopant having a function of increasing a refractive index of the light propagating material and having a first thermal diffusion coefficient to said light propagating material at a predetermined temperature, the second dopant having a function of decreasing the refractive index of said light propagating material and having a second thermal diffusion coefficient to said light propagating material at the predetermined temperature, the second thermal diffusion coefficient being larger than the first thermal diffusion coefficient at the predetermined temperature.

In one form of dopant distribution, the first dopant and the second dopant have substantially uniform concentration distribution in the core portion. In other form of dopant distribution. The second dopant has a substantially uniform concentration distribution in the core portion but the concentration distribution in the core portion of the first dopant is high at a substantially center area and low in a peripheral area so that a refractive index in the periphery of the core is smaller than that of a cladding portion. The concentration distribution of the first dopant in this case is substantially parabolic or stepwise.

An optical waveguide in accordance with another aspect of the present invention is further featured by that a spot size of a propagating mode of the optical waveguide at a predetermined portion thereof is smaller than that of the other portion thereof and the formation of the smaller portion in the spot size is performed by heating the predetermined portion at the predetermined temperature.

In an optical waveguide according to the present invention, a predetermined portion of the optical waveguide is heated and a spot size of a propagating mode is changed at the predetermined portion. In a method for converting a spot size of a propagating mode of the present invention, a predetermined portion of the optical waveguide is heated and the spot size is changed at the predetermined portion.

By heating the predetermined portion of the optical waveguide, the first and second dopants are thermally diffused from the predetermined portion of the core portion. In this case, since the second thermal diffusion coefficient is larger than the first thermal diffusion coefficient at a predetermined temperature, the second dopant diffuses to a more distant area from the center of the core than the first dopant does. As a result, in both forms of the dopant distribution described above, a difference between a refractive index in the area close to the center of the core and a refractive index of the area distant from the center of the core relatively increases. Consequently, the spot size of the mode is reduced at the predetermined area having thermal processing applied thereto. In the second form of the dopant distribution, the spot size of the mode is reduced by an effect of substantial increase of the core size in which the refractive index is larger than that of the clad by the diffusion of the second dopant.

When the predetermined portion of the other optical waveguide is heated, the first dopant diffuses from the predetermined portion of the core portion to the cladding portion and the second dopant diffuses from the clad to the core portion. Since both diffusions have effects of lowering the differential refractive index Δn between the core portion and the cladding portion, the spot size of the mode is increased at the predetermined portion having the heat treatment applied thereto at a faster speed than that of the prior art.

Here, the differential refractive index Δn between the core portion and the cladding portion means the following.

$$\Delta n = ((n1 \times n1) - (n2 \times n2))/(2 \times n1 \times n1) \simeq (n1 - n2)/n1$$

The n1 is a refractive index of the core portion, and the n2 is a refractive index of the cladding portion.

As a result, the optical waveguide having the spot size of the mode changed at the desired portion is attained. Such an optical waveguide may be used as not only a mere optical transmission line but also an optical device for converting the spot size of the mode at a small loss.

The present invention will become more fully understood from the detailed description given hereinbelow and the accompanying drawings which are given by way of illustartion only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

BRIEF DESCRIPTION OF THE DRAWINGS

FIG. 1A shows a structure of an optical fiber according to the present invention, FIG. 7A shows a structure of an optical fiber according to the third embodiment.

DETAILED DESCRIPTION OF THE PREFERRED EMBODIMENTS

The embodiments of the present invention are now briefly explained with reference to the accompanying drawings.

First Embodiment

FIG. 1A shows a structure of an optical fiber of a first embodiment. The optical fiber has a core to which Ge and F are added at a substantially uniform concentration as shown in FIG. 1A.

A thermal diffusion coefficient of the F is larger than that of the Ge at the temperature of 1600° C. to 2200° C. That is, the F is diffusing faster than the Ge above 1600° C.

Figure 1B:
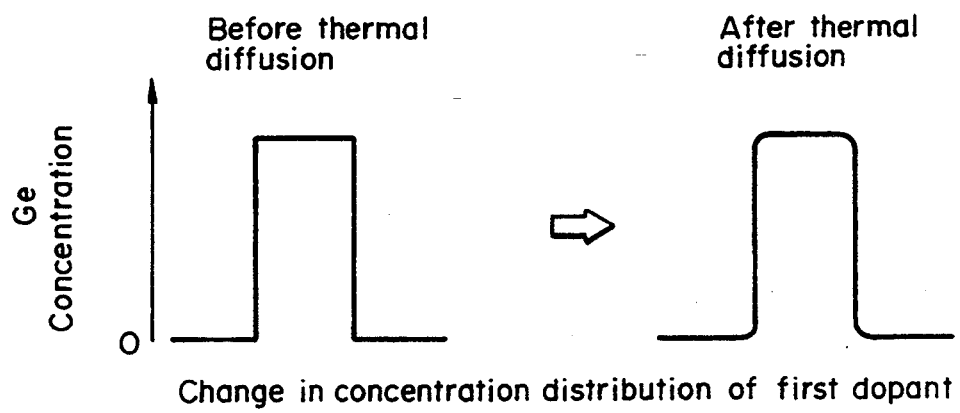
FIGS. 1B–1D are drawings for explaining the convertion of a mode field diameter of an optical fiber according to the first embodiment.
Figure 1C:
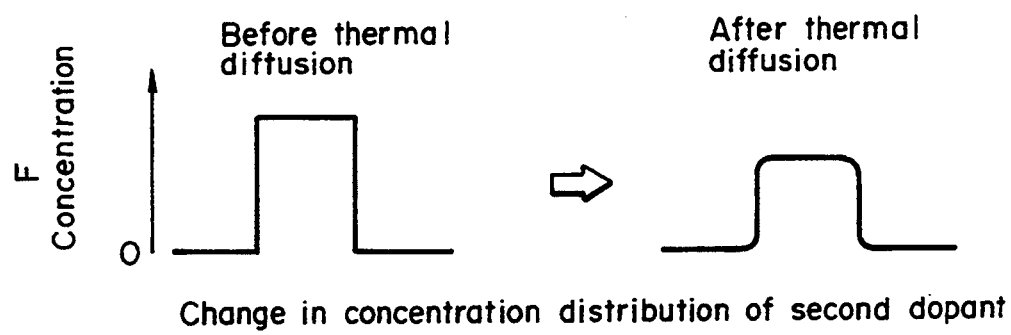
Figure 1D:
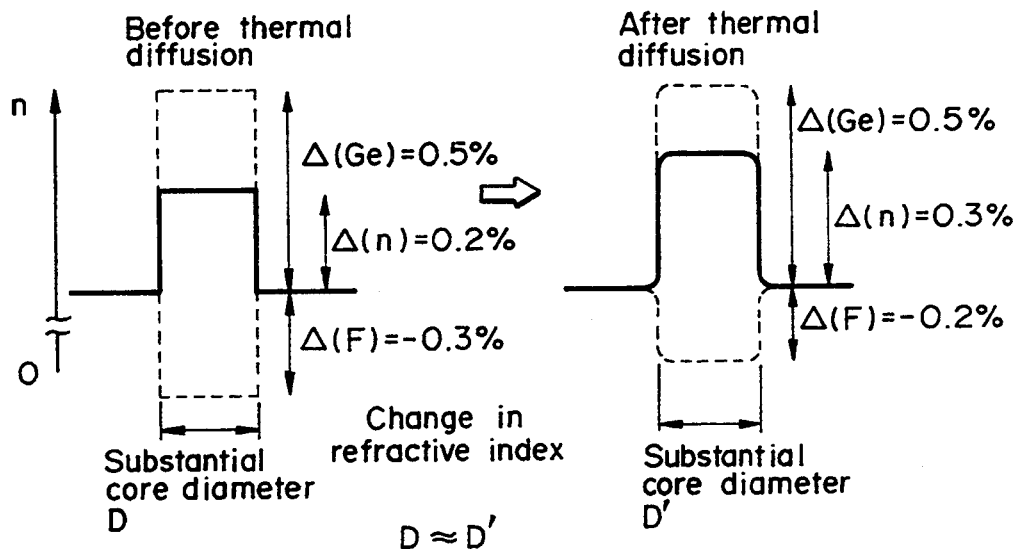
Figure 2:
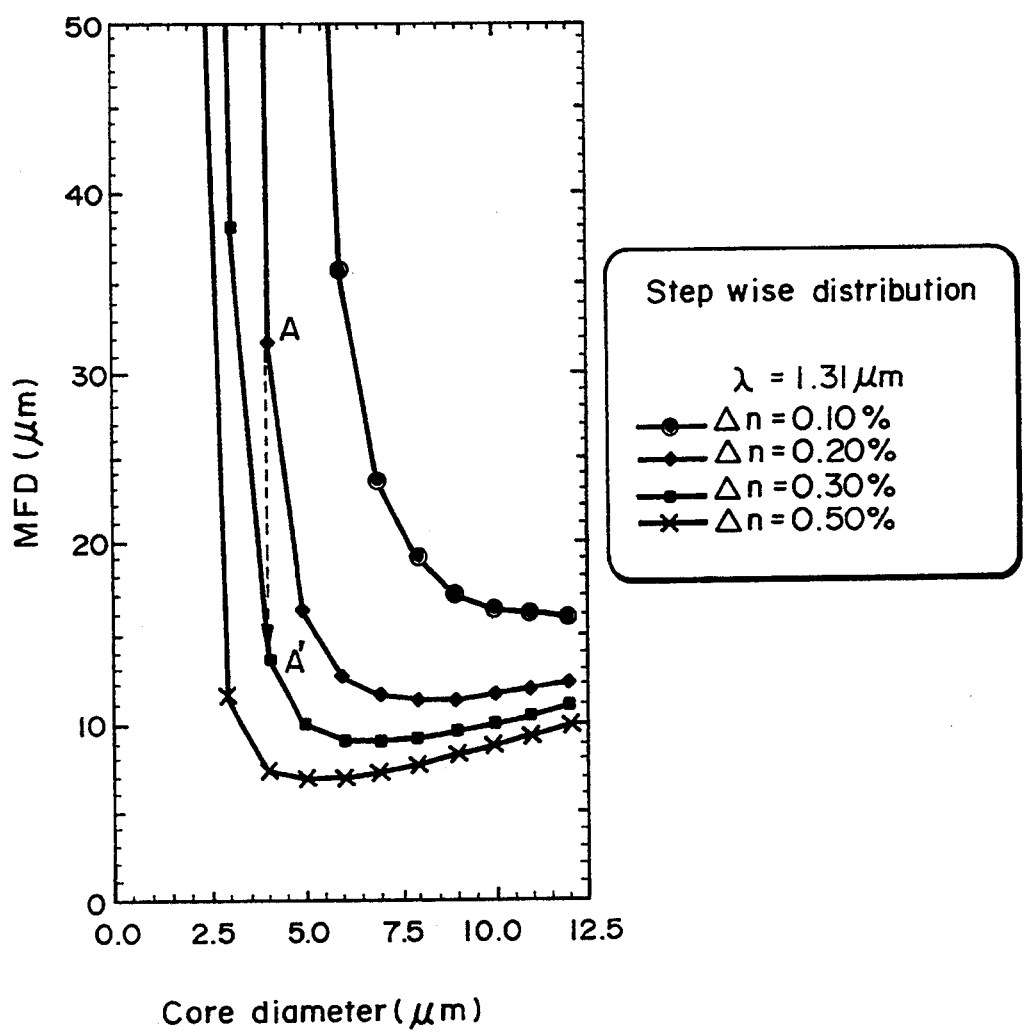
FIG. 2 shows a graph of a relation between a core diameter and a refractive index distribution, and a mode field diameter, in the first embodiment.
Figure 3A:
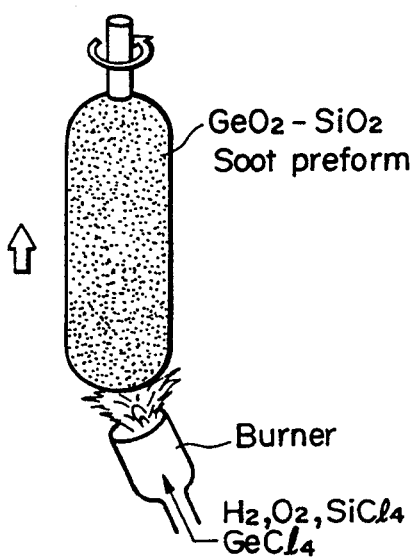
FIGS. 3A–3D show a manufacturing process of the fiber of the first embodiment.
Figure 3B:
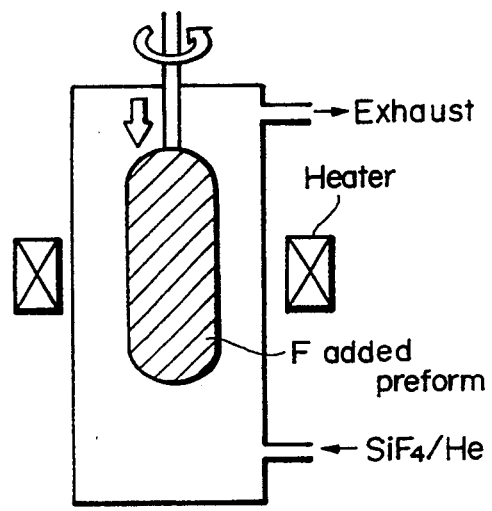
Figure 3C:
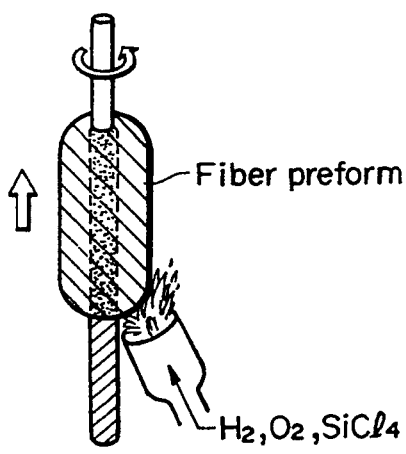
Figure 3D:
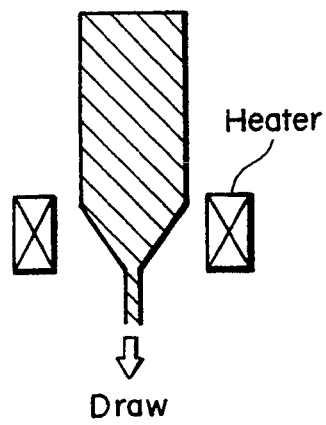

FIGS. 1B–1D schematically show a structure and changes in distributions before and after the heat treatment for converting the mode field diameter. FIG. 1B shows a change in a concentration distribution of the first dopant added to the core, FIG. 1C shows a change in a concentration distribution of the second dopant added to the core, and FIG. 1D shows a change in a refractive index near the core. A graph in FIG. 2 shows relation between the mode field diameter and core diameter, and a difference of refractive indices between the core and the cladding when the distribution of the refractive index in the fiber is stepwise.

The fiber prior to heating shown in FIG. 1A is a single mode fiber and is formed by a known VAD method in a process shown in FIGS. 3A–3D. Soot preform for the core made of quartz having germanium (Ge) added thereto as the first dopant (see FIG. 3A) and fluorine (F) is added as the second dopant before it is made transparent (see FIG. 3B). Then, the soot preform for the core is made transparent and elongated to an appropriate outer diameter, and soot for the cladding is formed around it using it as an axis (see FIG. 3C). Then, the soot for the cladding is made transparent to form preform for forming the optical fiber. The preform is drawn under an appropriate condition (see FIG. 3D). In this manner, the optical fiber for the mode field diameter conversion having Ge and F added to the core is formed.

Referring to FIG. 1B to FIG. 1D and FIG. 2, a method and a principle of forming the above optical fiber into the mode field diameter conversion fiber are described. In the following discussion, it is assumed herein that fluorine diffuses sufficiently faster than germanium by heating and after the heating the concentration distribution of fluorine substantially uniformly decreases and the concentration distribution of germanium does not substantially change. The diameter of the core of the optical fiber before the heat treatment is 4 μm.

As shown in FIG. 1B, in the core area of the optical fiber before the thermal diffusion, Ge is added in the core area at a substantially uniform concentration. Further, as shown in FIG. 1C, F is also added to the core area at a substantially uniform concentration. It is assumed that a contribution Δ(Ge) of Ge to the differential refractive index is 0.5%, and a contribution Δ(F) of F to the differential refractive index is −0.3%. The heat treatment is applied to a desired portion of the optical fiber to thermally diffuse Ge and F. Ge does not substantially diffuse as shown on the right hand of FIG. 1B but F widely diffuses as shown on the right hand of FIG. 1C and the contribution Δ(F) of F in the core to the differential refractive index changes to −0.2%.

Referring to FIG. 1D, a change in the refractive indices near the core before and after the thermal diffusion is discussed. The optical fiber before the thermal diffusion exhibits a substantially uniform refractive index distribution in the core area as shown by a solid line. A differential refractive index Δ(n) between the core and the cladding is 0.2%. A broken line shows a refractive index distribution due to Ge or F. When heat treatment is applied to the desired portion of the optical fiber to thermally diffuse Ge and F, the core diameter does not substantially change as shown by a solid line on the right hand of the drawing, and the differential refractive index Δ(n) is 0.3%. The change in the mode field diameter for the above changes is discussed with reference to FIG. 2. Before heating, the differential refractive index Δ(n) is 0.2% and the core diameter is 4 μm which corresponds to a point A in the graph of FIG. 2, and the mode field diameter is 32 μm. After the thermal diffusion by heating, the differential refractive index Δ(n) is 0.3% and the core diameter is 4 μm which corresponds to a point A' in the graph of FIG. 2, and the mode field diameter decreases to 14 μm.

Second Embodiment

Figure 4A:
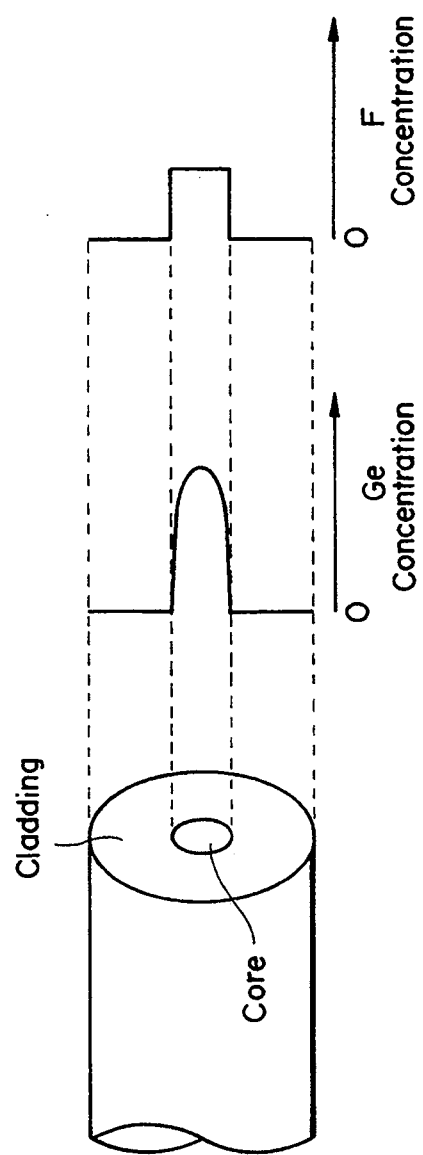
FIG. 4A shows a structure of an optical fiber according to the second embodiment.

FIG. 4A shows a structure of an optical fiber of the second embodiment. The optical fiber has a core to which Ge is added at a substantially radial concentration distribution which is one of graded distributions and F is added at a substantially uniform concentration.

A thermal diffusion coefficient of the F is larger than that of the Ge at the temperature of 1600° C. to 2200° C. That is, the F is diffusing faster than the Ge above 1600° C.

Figure 4B:
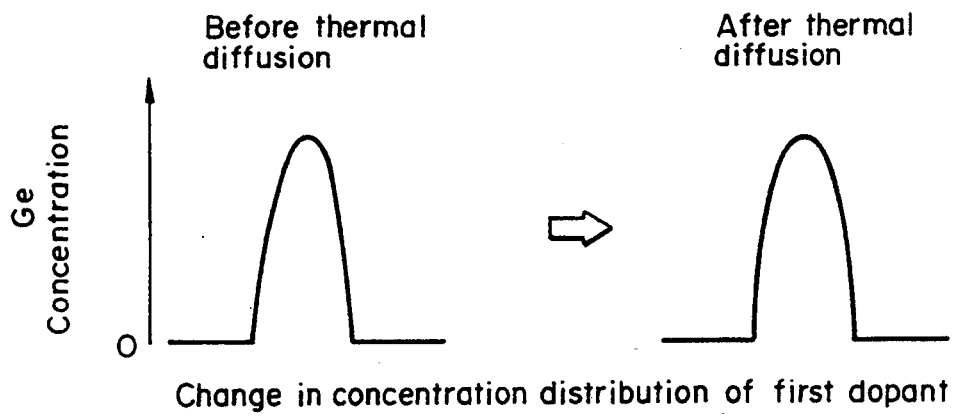
FIGS. 4B–4D are drawings for explaining the convertion of a mode field diameter of an optical fiber according to the second embodiment.
Figure 4C:
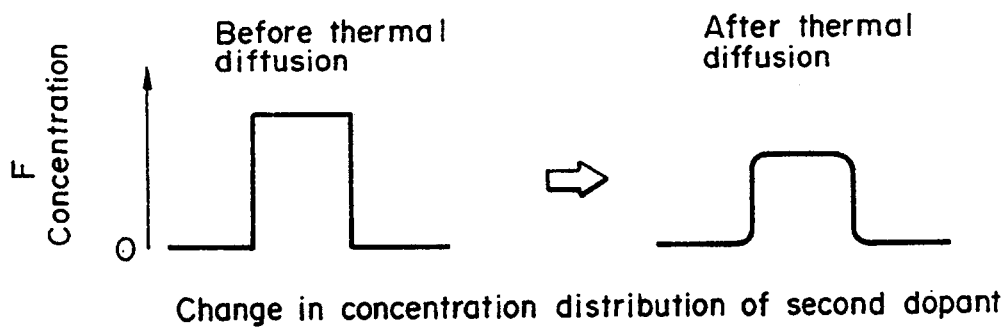
Figure 4D:
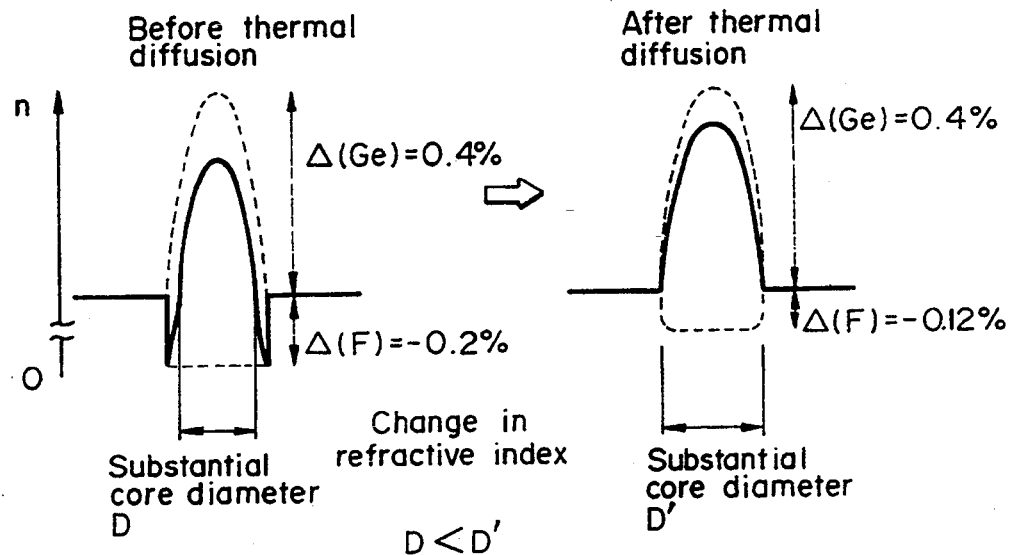
Figure 5:
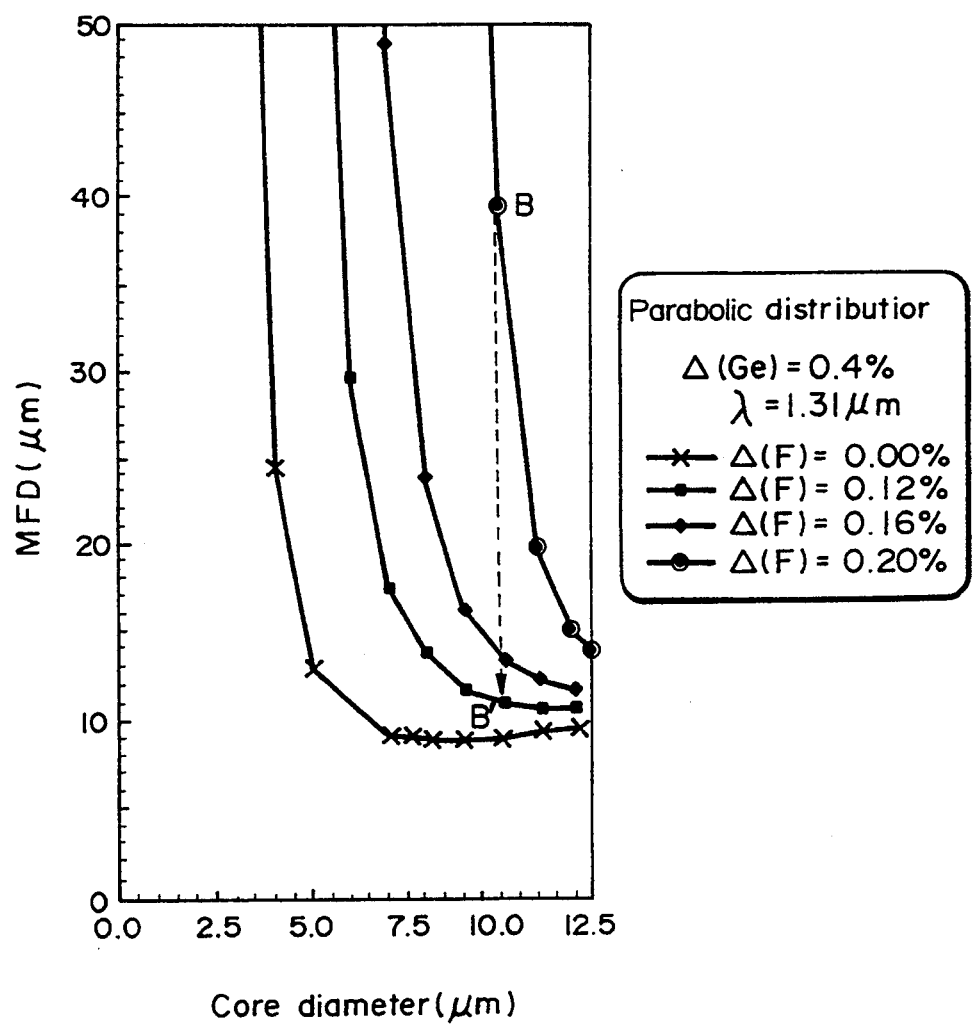
FIG. 5 shows a graph of a relation between the core diameter and the refractive index distribution, and the mode field diameter, in the second embodiment.
Figure 6A:
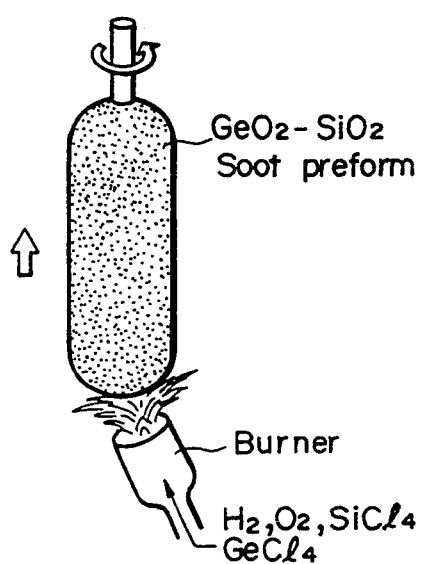
FIGS. 6A–6D show a manufacturing process of the fiber of the second embodiment.
Figure 6B:
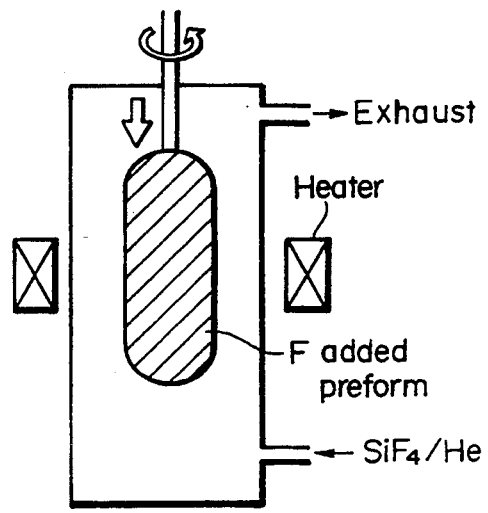
Figure 6C:
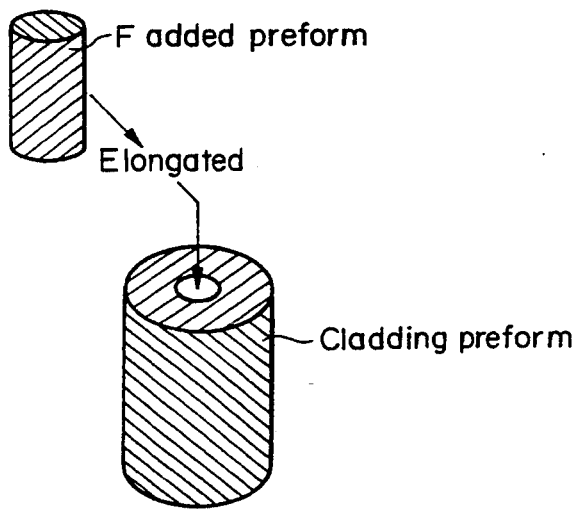
Figure 6D:
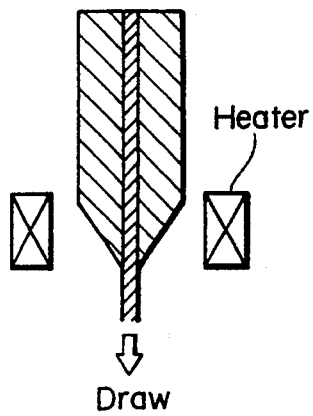

FIG. 4B-4D schematically show a structure and changes in distributions before and after the heat treatment for converting the mode field diameter. FIG. 4B shows a change in a concentration distribution of the first dopant added to the core, FIG. 4C shows a change in a concentration distribution of the second dopant added to the core, and FIG. 4D shows a change in the refractive index near the core. A graph of FIG. 5 shows a relation between the mode field diameter and the core diameter, and the differential refractive index between the core and the cladding when the distribution of the refractive index in the fiber is of graded type.

The optical fiber before heating shown in FIG. 4A is a single mode fiber and it is formed by a known VAD method or rod-in-tube method in a process shown in FIGS. 6A-6D. Soot preform for the core made of quartz having germanium (Ge) added thereto as the first dopant is formed (see FIG. 6A), and before it is made transparent, fluorine (F) is added as the second dopant (see FIG. 6B). Then, the soot preform for the core is made transparent and elongated and inserted into a cylindrical cladding preform to form a fiber preform (see FIG. 6C). Then, the fiber preform is drawn under an appropriate condition (see FIG. 6D). In this manner, the optical fiber for the mode field conversion having Ge and F added to the core is formed.

Referring to FIGS. 4B to 4D, a method and a principle of forming the above optical fiber to the mode field diameter conversion fiber are explained. In the following discussion, it is assumed that fluorine diffuse sufficiently faster than germanium, and after heating the concentration distribution of fluorine substantially uniformly decreases and the concentration distribution of germanium does not substantially change. The core diameter of the optical fiber before heat treatment is 10 μm.

As shown in FIG. 4B, in the core area of the optical fiber before the thermal diffusion, Ge is added at a substantially radial concentration distribution which is one of graded distributions and as shown in FIG. 4C, F is added at a substantially uniform concentration. It is assumed that the contribution $\Delta(Ge)$ of Ge to the differential refractive index is 0.4% and the contribution $\Delta(F)$ of F to the differential refractive index is $-0.2\%$. Heat treatment is applied to a desired portion of the optical fiber having the structure described above to thermally diffuse Ge and F. Ge does not substantially diffuse as shown on the right hand of FIG. 1B but F widely diffuses as shown on the right hand of FIG. 4C so that the contribution $\Delta(F)$ of F to the differential refractive index in the core area changes to $-0.12\%$.

Referring to FIG. 4D, the change in the refractive indices near the core before and after the thermal diffusion is discussed. The optical fiber before the thermal diffusion exhibits a substantially parabolic refractive index distribution in the core area as shown by a solid line. In the core periphery, the contribution by F to the increase of the refractive index is larger than the contribution by Ge to the increase of the refractive index and the diameter of the substantial core area having a larger refractive index than that of the cladding is smaller than the core diameter formed in the process of FIGS. 6A-6D. A broken line shows a refractive index distribution due to Ge or F. When heat treatment is applied to the desired portion of the optical fiber to thermally diffuse Ge and F, the refractive index of the core area increases and the core diameter substantially increases as shown on the right hand of the drawing. The change of the mode field diameter for the above changes is discussed with reference to FIG. 5. Before heating, the differential refractive index contribution $\Delta(Ge)$ of Ge is 0.4%, the differential refractive index contribution $\Delta(F)$ of F is $-0.2\%$, and the substantial core diameter is no larger than 10 μm. From the coordinate of a point B on the graph of FIG. 5, the mode field diameter is at least approximately 40 μm. After the thermal diffusion by heating, the differential refractive index contribution $\Delta(Ge)$ of Ge is 0.4%, the differential refractive index contribution $\Delta(F)$ of F is $-0.12\%$ and the substantial core diameter is approximately 10 μm, which corresponds to a point B' on the graph of FIG. 5, and the mode field diameter is reduced to approximately 11 μm. In the present embodiment, the increase of the differential refractive index between the core and the cladding of the first embodiment as well as the increase of the substantial core diameter contribute to the reduction of the mode field diameter by heating so that efficient reduction of the mode field diameter is attained.

Third Embodiment

FIG. 7A shows a structure of an optical fiber of a third embodiment. The optical fiber has a core area to which Ge is added at a substantially stepwise (two steps) concentration distribution and F is also added at a substantially uniform concentration.

A thermal diffusion coefficient of the F is larger than that of the Ge at the temperature of 1600° C. to 2200° C. That is, the F is diffusing faster than the Ge above 1600° C.

Figure 7B:
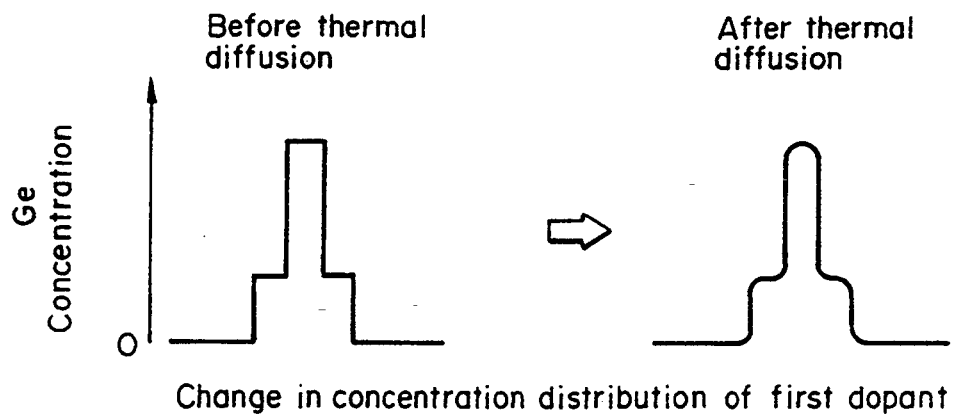
FIGS. 7B–7D are drawings for explaining the convertion of a mode field diameter in the optical fiber of the third embodiment.
Figure 7C:
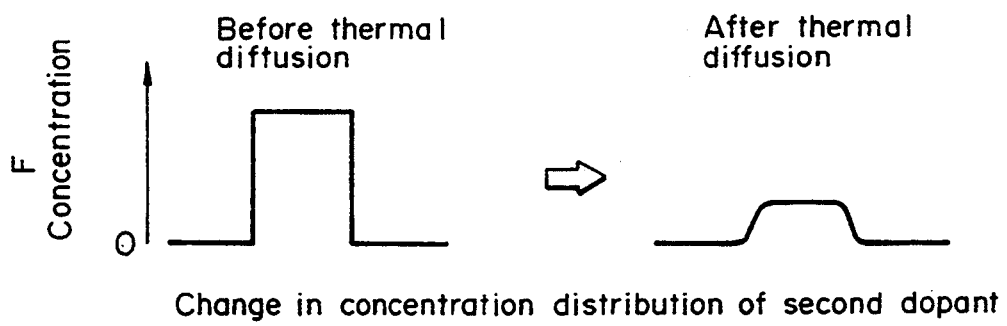
Figure 7D:
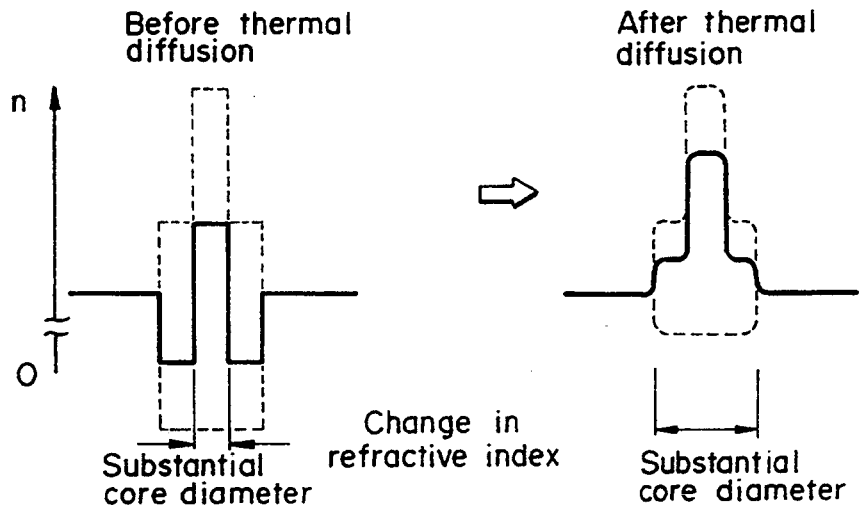
Figure 8A:
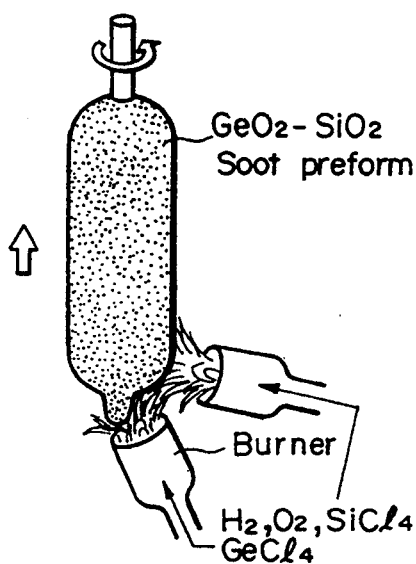
FIGS. 8A–8D show a manufacturing process of the fiber of the third embodiment.
Figure 8B:
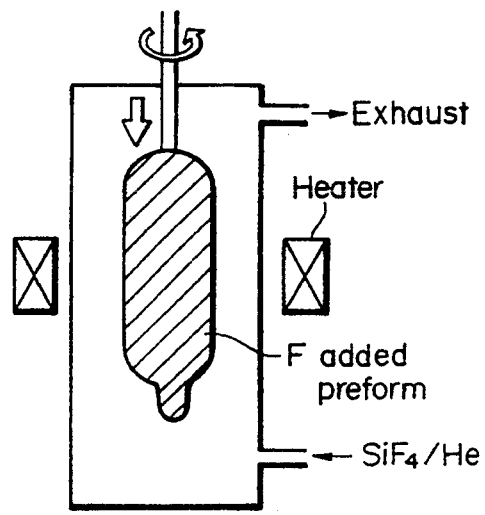
Figure 8C:
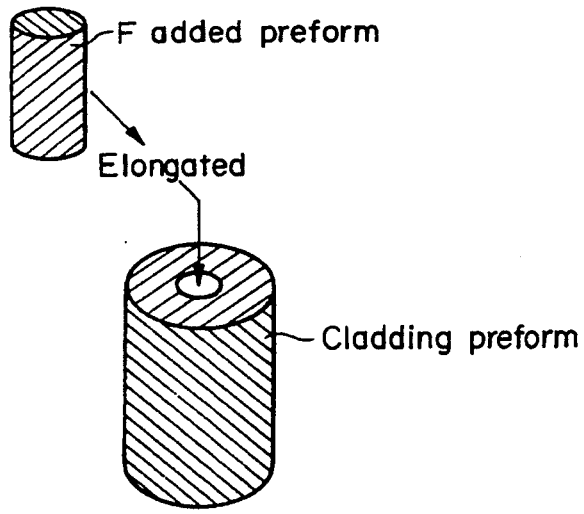
Figure 8D:
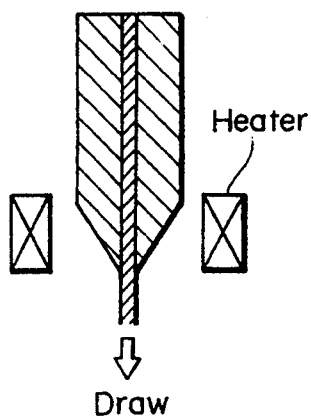

FIGS. 7B-7D schematically show a structure and changes in distributions before and after the heat treatment for converting the mode field diameter. FIG. 7B shows a change in the concentration distribution of the first dopant added to the core, FIG. 7C shows a change in the concentration distribution of the second dopant added to the core, and FIG. 7D shows a change in the refractive index near the core.

The fiber prior to heating shown in FIG. 7A is a single mode fiber and is formed by a known VAD method or rod-in-tube method in a process shown in FIGS. 8A-8D. Soot preform for the core made of quartz having germanium (Ge) added thereto as the first dopant (see FIG. 8A) and fluorine (F) is added as the second dopant before it is made transparent (see FIG. 8B). Then, the soot preform for the core is made transparent and expanded and inserted into a cylindrical cladding preform to form a fiber preform (see FIG. 8C). Then, the fiber preform is drawn under an appropriate condition (see FIG. 8D). In this manner, the optical fiber for the mode field diameter conversion having Ge and F added to the core is formed.

Referring to FIG. 7B to FIG. 7D, a method and a principle of forming the above optical fiber into the mode field diameter conversion fiber are described. In the following discussion, it is assumed herein that fluorine diffused sufficiently faster than germanium by heating and after the heating the concentration distribution of fluorine substantially uniformly decreases and the concentration distribution of germanium does not substantially change.

As shown in FIG. 7B, in the core area of the optical fiber before the thermal diffusion, Ge is added in the core area at a substantially stepwise (two steps) concentration distribution and as shown in FIG. 7C, F is also added to the core area at a substantially uniform concentration. The heat treatment is applied to a desired portion of the optical fiber to thermally diffuse Ge and F. Ge does not substantially diffuse as shown on the right hand of FIG. 7B but F widely diffuses as shown on the right hand of FIG. 7C.

Referring to FIG. 7D, a change in the refractive indices near the core before and after the thermal diffusion is discussed. The optical fiber before the thermal diffusion exhibits a substantially stepwise refractive index distribution in the core area as shown by a solid line. The contribution to the decrease of the refractive index by F is larger than the contribution to the increase of the refractive index by Ge and the substantial core diameter in which the refractive index is larger than that of the cladding is smaller than the core diameter formed in the process of FIGS. 6A-6D. A broken line shows a refractive index distribution due to Ge or F. When heat treatment is applied to the desired portion of the optical fiber to thermally diffuse Ge and F, the refractive index of the core increases and the substantial core diameter increases. In the present embodiment, since the increase of the differential refractive index between the core and the cladding of the first embodiment as well as the increase of the substantial core diameter contribute to the decrease of the mode field diameter by heating, so they do in the second embodiment, efficient reduction of the mode field diameter is attained.

Figure 9:
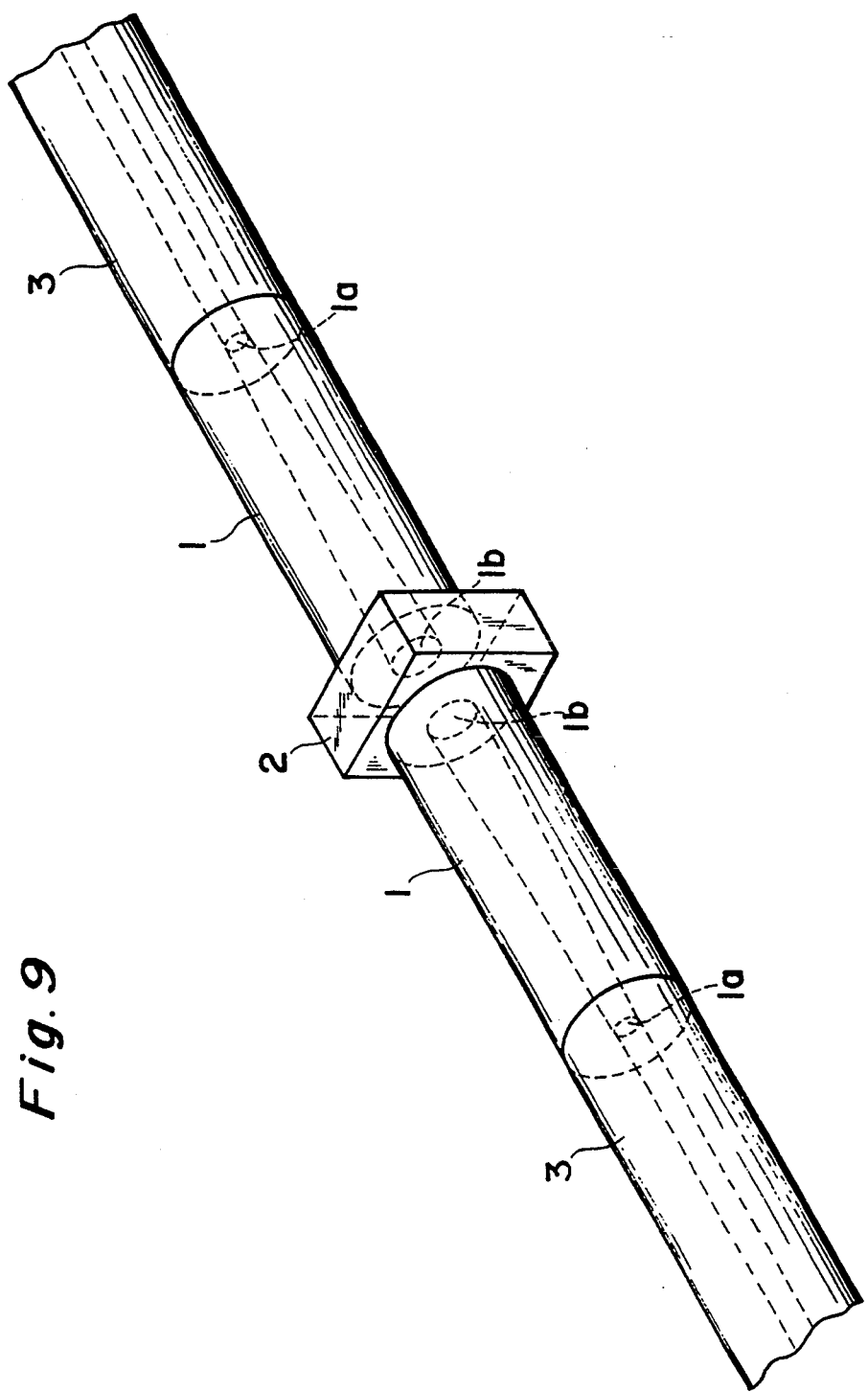
FIG. 9 shows an example of application of the optical waveguide.

The optical waveguide capable of changing a spot size of a propagating mode may be used in various applications which require to narrow a spot size of a propagating mode. For example, as shown in FIG. 9, an optical device 2 such as a filter, an isolator and so on, can be inserted between fibers 3 for optical communication which has a small mode field diameter, through an optical waveguide 1 of the present invention, resulting in no significant loss increase. That is, one end of the optical waveguide 1 having a large spot size 16 of a propagating mode are optically connected to the optical device 2 having a large spot size of a propagating mode decreases the diffraction loss due to the insertion of the optical device 2, and the other end of the optical waveguide having a narrowed spot size 1a is optically connected to the optical fiber 3 having a small mode field diameter. The narrowed spot size portion 1a of the optical waveguide 1 is formed by heating the portion 1a at the predetermined temperature, such as 1600° C. to 2200° C.

Further, the optical fiber 3 and the optical waveguide 1 also may be fused at the predetermined temperature to be connected to each other. Additionally, an interface between the optical device 2 such as a filter and the optical waveguide may be slightly inclined with respect to a light transmission direction of them. The core diameter of the waveguide for the above embodiments is desired to be smaller than one in which minimizes a spot size of a propagating mode, because the change of the spot size by thermal diffusion can be increased as shown in FIGS. 2 and 5.

Figure 10:
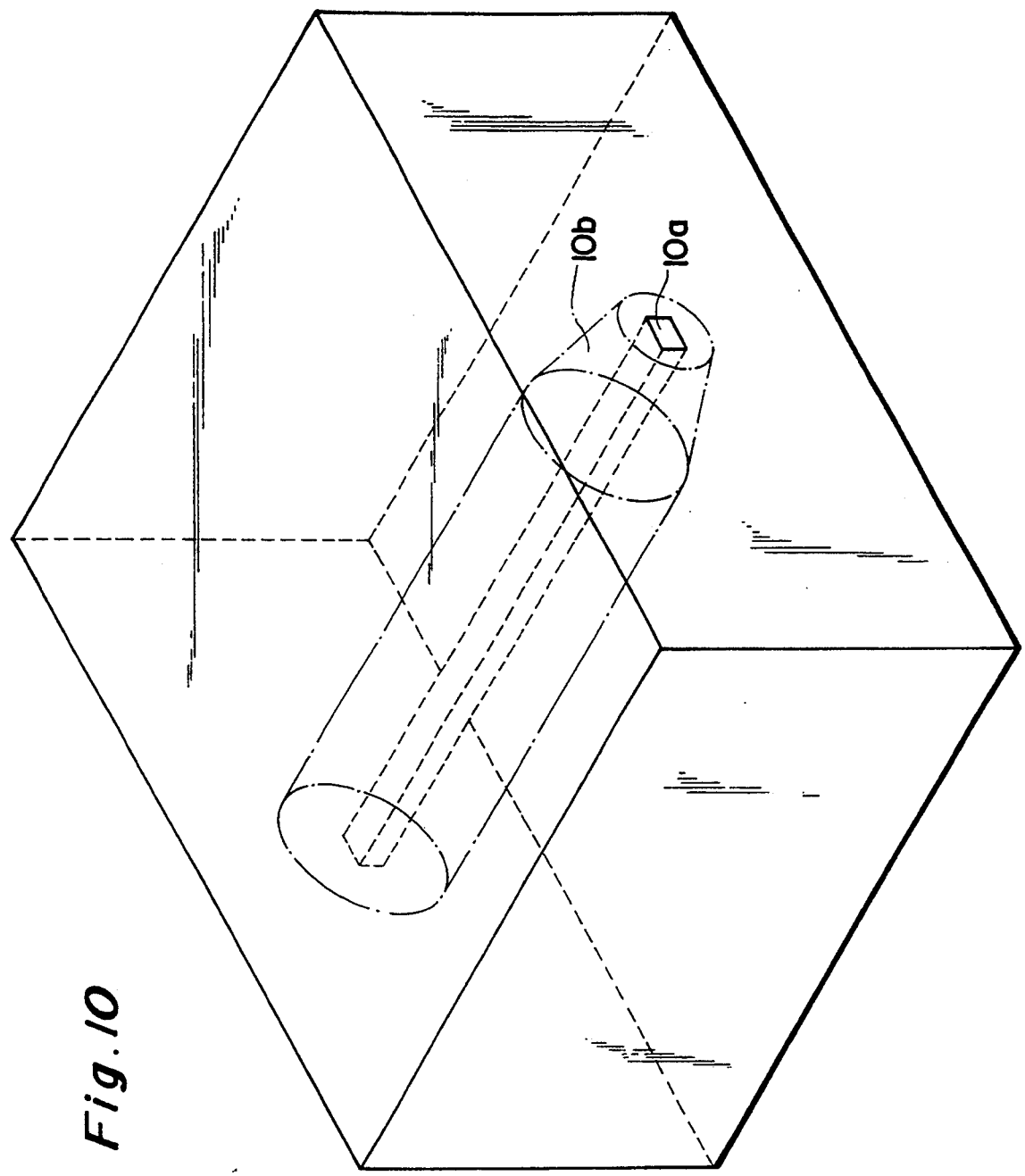
FIG. 10 shows an example of application of the present invention to an optical waveguide.

Further, the above embodiments are directed to an optical fiber, but the present invention can be applied to a planar optical waveguide as shown in FIG. 13. In the case of the planar optical waveguide, the light guide path may be formed by flame hydrolisys deposition or plasma induced chamical vapor deposition. In FIG. 10, a core 10a is formed as a rectangular and a spot size of a propagating mode is narrowed by heating a portion 10b.

While the present invention has been explained with reference to the embodiments, various modifications thereof may be made. For example, the optical waveguide capable of change a spot size of the mode of the present invention may be formed by various methods including MCVD method, OVD method and double crucible method. The first and second dopants are not limited to Ge and F but various other dopants may be used. The differential refractive index between the core portion and the cladding portion may be set to a desired value depending on the setting condition of the thermal diffusion temperature. Not only the single mode fiber but also a multi-mode type optical waveguide attains the same effects.

In accordance with the optical waveguide according to the present invention, the first dopant which increases the refractive index is added to the core and the second dopant which decreases the refractive index and has a larger thermal diffusion coefficient than that of the first dopant at a predetermined temperature is added to the core and the clad with the distribution. Accordingly, by heating the predetermined portion at the predetermined temperature, the difference between the refractive index in the area close to the center of the core and the refractive index distant from the center of the core relatively increases or decreases and the mode field diameter increases or decreases in a short time at the predetermined portion which has been heat-treated. When the optical waveguide having a spot size of a propagating mode which decreases by heating is used, the core diameter is set to be smaller than one which minimizes the spot size in the propagating mode and the dopant distribution is set to increase the substantial core diameter by heating so that the spot size is efficiently reduced. As a result, the optical waveguide having the spot size of a propagating mode changed at the desired point is formed. With such an optical waveguide, an optical waveguide having a larger or smaller spot size can be connected to an optical part having a smaller or larger mode field diameter with a small loss.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. An optical waveguide comprising:
    a core portion made of a light propagating material; and
    a cladding portion,
    a first dopant and a second dopant being induced into said core portion,
    said first dopant adapted so as to increase a refractive index of said light propagating material and having a first thermal diffusion coefficient to said light propagating material at a predetermined temperature,
    said second dopant adapted so as to increase the refractive index of said light propagating material and having a second thermal diffusion coefficient to said light propagating material, said second thermal diffusion coefficient being larger than said first thermal diffusion coefficient at the predetermined temperature,
    wherein a core size of said optical waveguide at a predetermined portion thereof is smaller than that of said optical waveguide where a spot size of a propagating mode is minimized.

2. An optical waveguide according to claim 1, wherein a concentration distribution in said core of said first dopant is substantially uniform.

3. An optical waveguide according to claim 1, wherein a concentration distribution in said core of said first dopant is substantially high at a center of said core and low at a periphery of said core.

4. An optical waveguide according to claim 3, wherein a concentration distribution in said core of said first dopant is substantially parabolic.

5. An optical waveguide according to claim 3, wherein a concentration distribution in said core of said first dopant is substantially stepwise.

6. An optical waveguide according to claim 1, wherein a concentration distribution in said core of said second dopant is substantially uniform.

7. An optical waveguide according to claim 1, wherein said optical waveguide is an optical fiber.

8. An optical waveguide according to claim 1, wherein said optical waveguide is a planar light waveguide.

9. An optical waveguide according to claim 1, wherein said first dopant is germanium and said second dopant is fluorine.

10. An optical waveguide according to claim 1, wherein the predetermined temperature is about 1600° C. to 2200° C.

11. An optical waveguide comprising:
a core portion made of a light propagating material; and
a cladding portion,
a first dopant and a second dopant being induced into said core portion,
said first dopant adapted so as to increase a refractive index of said light propagating material and having a first thermal diffusion coefficient to said light propagating material at a predetermined temperature,
said second dopant adapted so as to decrease the refractive index of said light propagating material and having a second thermal diffusion coefficient to said light propagating material, said second thermal diffusion coefficient being larger than said first thermal diffusion coefficient at the predetermined temperature,
wherein a spot size of a propagating mode in said optical waveguide at a predetermined portion thereof is smaller than that at other portions thereof.

12. An optical waveguide according to claim 11, wherein a concentration distribution in said core of said first dopant is substantially uniform.

13. An optical waveguide according to claim 11, wherein a concentration distribution in said core of said first dopant is substantially high at a center of said core and low at a periphery of said core.

14. An optical waveguide according to claim 13, wherein a concentration distribution in said core of said first dopant is substantially stepwise.

15. An optical waveguide according to claim 11, wherein a concentration distribution in said core of said second dopant is substantially uniform.

16. An optical waveguide according to claim 11, wherein a core size of said optical waveguide at a predetermined portion thereof is smaller than that of said optical waveguide where a spot size of a propagating mode of said optical waveguide is minimized.

17. An optical waveguide according to claim 11, wherein said optical waveguide is an optical fiber.

18. An optical waveguide according to claim 11, wherein said optical waveguide is a planar light waveguide.

19. An optical waveguide according to claim 11, wherein said first dopant is germanium and said second dopant is fluorine.

20. An optical waveguide according to claim 11, wherein the predetermined temperature is about 1600° C. to 2200° C.

21. A method for converting a mode field diameter of an optical fiber comprising the steps of:
heating a predetermined portion of an optical waveguide at a predetermined temperature, thereby reducing spot size of a propagating mode at said predetermined portion, wherein said optical waveguide includes:
a core portion made of a light propagating material;
a cladding portion; and
a first dopant and a second dopant being induced into said core portion,
increasing a refractive index of said light propagating material using said first dopant, which has a first thermal diffusion coefficient to said light propagating material at a predetermined temperature,
decreasing the refractive index of said light propagating material using said second dopant, which has a second thermal diffusion coefficient to said light propagating material, said second thermal diffusion coefficient being larger than said first thermal diffusion coefficient at the predetermined temperature.

22. An optical waveguide according to claim 21, wherein heating step includes heating said predetermined portion to said predetermined temperature, which is about 1600° C. to 2200° C.

23. A method for converting a mode field diameter of an optical waveguide comprising the steps of:
heating a predetermined portion of an optical waveguide at a predetermined temperature, thereby increasing spot size of a propagating mode at the predetermined portion, wherein said optical waveguide includes:
a core portion made of a light propagating material; and
a cladding portion,
a first dopant and a second dopant being induced into said core portion,
increasing a refractive index of said light propagating material using said first dopant, which has a first thermal diffusion coefficient to said light propagating material at a predetermined temperature,
decreasing the refractive index of said light propagating material using said second dopant, which has a second thermal diffusion coefficient to said light propagating material, said second thermal diffusion coefficient being larger than said first thermal diffusion coefficient at the predetermined temperature.

24. An optical waveguide according to claim 23, wherein said predetermined temperature is about 1600° C. to 2200° C.

* * * * *